(12) United States Patent
Wang et al.

(10) Patent No.: US 10,401,815 B2
(45) Date of Patent: Sep. 3, 2019

(54) SYSTEM AND METHOD FOR SYNCHRONIZING MESSAGES USING A LEAST COMMON MULTIPLE IN INDUSTRIAL PROCESS CONTROL AND AUTOMATION SYSTEMS

(71) Applicant: Honeywell International Inc., Morris Plains, NJ (US)

(72) Inventors: Yanqiu Wang, Shanghai (CN); Chengtao Zhang, Shanghai (CN); Fei Cheng, Shanghai (CN); Yi Cheng, Shanghai (CN); Li Chen, Shanghai (CN); Mei Fa Chen, Shanghai (CN)

(73) Assignee: Honeywell International Inc., Morris Plains, NJ (US)

( * ) Notice: Subject to any disclaimer, the term of this patent is extended or adjusted under 35 U.S.C. 154(b) by 323 days.

(21) Appl. No.: 15/490,789

(22) Filed: Apr. 18, 2017

(65) Prior Publication Data

US 2018/0299853 A1 Oct. 18, 2018

(51) Int. Cl.
*G05B 19/042* (2006.01)
*G05B 19/05* (2006.01)

(52) U.S. Cl.
CPC ....... *G05B 19/0423* (2013.01); *G05B 19/054* (2013.01); *G05B 2219/25474* (2013.01)

(58) Field of Classification Search
CPC ............ G05B 19/0426; G05B 2219/21; G05B 2219/25474
See application file for complete search history.

(56) References Cited

U.S. PATENT DOCUMENTS

| 8,392,626 | B2 | 3/2013 | Wormmeester et al. |
| 2002/0005669 | A1 | 1/2002 | Tanguay |
| 2003/0060931 | A1 | 3/2003 | Kumar et al. |
| 2003/0195722 | A1* | 10/2003 | Buda ............... G05B 19/05 702/188 |

(Continued)

FOREIGN PATENT DOCUMENTS

EP 2902286 A2 8/2015

OTHER PUBLICATIONS

International Search Report and Written Opinion of the International Searching Authority for International Patent Application No. PCT/US2018/027296 dated Jul. 27, 2018, 17 pages.

(Continued)

*Primary Examiner* — Glenn A. Auve

(57) ABSTRACT

A method includes determining a scan rate associated with each of a plurality of input/output (I/O) modules. The method also includes transmitting a read request message to at least one expansion controller that controls the plurality of I/O modules, the read request message having an align index field. The method further includes receiving a reply message from the at least one expansion controller for each of the I/O modules for which a value of the align index field of the read request message is an even multiple of the associated scan rate. The method also includes incrementing the value of the align index field. In addition, the method includes repeating the transmitting, receiving, and incrementing until the value of the align index field is greater than a threshold, wherein the threshold is a least common multiple of the scan rates of the plurality of I/O modules.

20 Claims, 4 Drawing Sheets

(56) References Cited

U.S. PATENT DOCUMENTS

| | | |
|---|---|---|
| 2004/0230334 A1 | 11/2004 | Geismar et al. |
| 2005/0016134 A1 | 1/2005 | Prebelli et al. |
| 2008/0307125 A1* | 12/2008 | Hildebran .......... G05B 19/0423 710/52 |
| 2013/0332633 A1* | 12/2013 | Carney ............... G06F 13/4291 710/48 |

OTHER PUBLICATIONS

Babiarz, P., "Intrinsic Safety Circuit Design," Oct. 1993, pp. Z131-Z148.

Hohenstein, D., et al., "Intrinsic Safety in a Nutshell," Technical White Paper, Pepperl+Fuchs, 2009, 3 pages.

"SMART Universal Barrier," HiC2441, Pepperl+Fuchs, May 2016, 5 pages.

U.S. Appl. No. 15/287,180, filed Oct. 6, 2016, 19 pages.

\* cited by examiner

| EPM | I/O MODULE<br>ScanTime = 20ms<br>SCAN RATE = 2 | I/O MODULE<br>ScanTime = 30ms<br>SCAN RATE = 3 |
|---|---|---|
| ALIGN INDEX<br>1 (10ms) | NOT READ | NOT READ |
| 2 (20ms) | READ | NOT READ |
| 3 (30ms) | NOT READ | READ |
| 4 (40ms) | READ | NOT READ |
| 5 (50ms) | NOT READ | NOT READ |
| 6 (60ms) | READ | READ |
| 1 (10ms) | NOT READ | NOT READ |
| 2 (20ms) | READ | NOT READ |

SYSTEM AND METHOD FOR SYNCHRONIZING MESSAGES USING A LEAST COMMON MULTIPLE IN INDUSTRIAL PROCESS CONTROL AND AUTOMATION SYSTEMS

TECHNICAL FIELD

This disclosure relates generally to industrial process control and automation systems. More specifically, this disclosure relates to a system and method for synchronizing messages using a least common multiple in industrial process control and automation systems.

BACKGROUND

Industrial process control and automation systems are often used to automate large and complex industrial processes. These types of systems routinely include various components including sensors, actuators, and controllers. Some of the controllers can receive measurements from the sensors and generate control signals for the actuators. In some systems, controllers, sensors, and actuators can be added and removed from the system at different times. When components are added at different times and their system clocks are not synchronized, communication between components, such as measurement messages from multiple sensors to a controller, can become out of synchronization.

SUMMARY

This disclosure provides a system and method for synchronizing messages using a least common multiple in industrial process control and automation systems.

In a first embodiment, a method includes determining a scan rate associated with each of a plurality of input/output (I/O) modules. The method also includes transmitting a read request message to at least one expansion controller that controls the plurality of I/O modules, the read request message having an align index field. The method further includes receiving a reply message from the at least one expansion controller for each of the I/O modules for which a value of the align index field of the read request message is an even multiple of the associated scan rate. The method also includes incrementing the value of the align index field. In addition, the method includes repeating the transmitting, receiving, and incrementing until the value of the align index field is greater than a threshold, wherein the threshold is a least common multiple of the scan rates of the plurality of I/O modules.

In a second embodiment, an apparatus includes at least one network interface and at least one processing device. The at least one network interface is configured to communicatively connect to at least one expansion controller that controls a plurality of I/O modules. The at least one processing device is configured to determine a scan rate associated with each of the I/O modules. The at least one processing device is also configured to transmit a read request message to the at least one expansion controller, the read request message having an align index field. The at least one processing device is further configured to receive a reply message from the at least one expansion controller for each of the I/O modules for which a value of the align index field of the read request message is an even multiple of the associated scan rate. The at least one processing device is also configured to increment the value of the align index field. In addition, the at least one processing device is configured to repeat the transmitting, receiving, and incrementing until the value of the align index field is greater than a threshold, wherein the threshold is a least common multiple of the scan rates of the plurality of I/O modules.

In a third embodiment, a non-transitory computer readable medium contains instructions that, when executed by at least one processing device, cause the at least one processing device to determine a scan rate associated with each of a plurality of I/O modules. The medium also contains instructions that, when executed by the at least one processing device, cause the at least one processing device to transmit a read request message to at least one expansion controller that controls the plurality of I/O modules, the read request message having an align index field. The medium further contains instructions that, when executed by the at least one processing device, cause the at least one processing device to receive a reply message from the at least one expansion controller for each of the I/O modules for which a value of the align index field of the read request message is an even multiple of the associated scan rate. The medium also contains instructions that, when executed by the at least one processing device, cause the at least one processing device to increment the value of the align index field. In addition, the medium further contains instructions that, when executed by the at least one processing device, cause the at least one processing device to repeat the transmitting, receiving, and incrementing until the value of the align index field is greater than a threshold, wherein the threshold is a least common multiple of the scan rates of the plurality of I/O modules.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
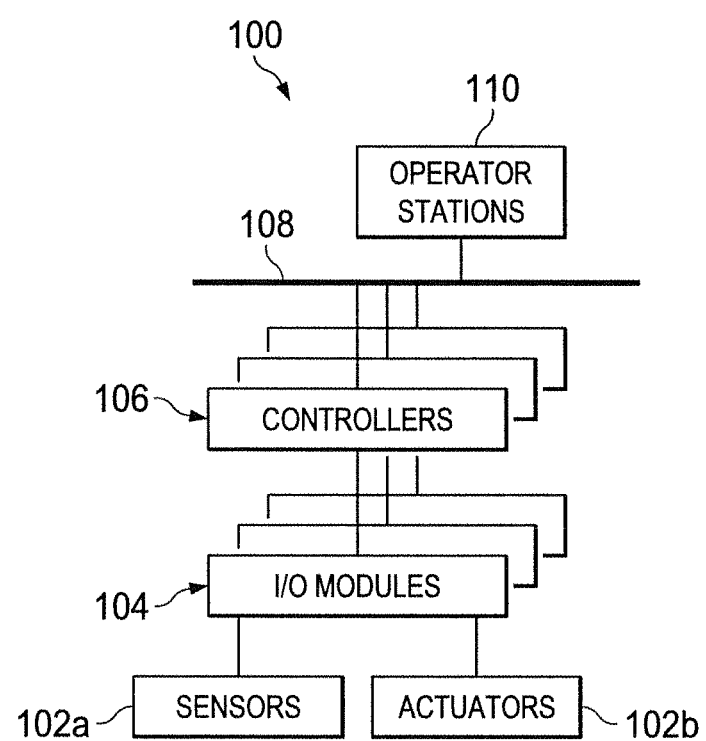
FIG. 1 illustrates a portion of an example industrial process control and automation system according to this disclosure.

FIG. 1 illustrates a portion of an example industrial process control and automation system 100 according to this disclosure. As shown in FIG. 1, the system 100 includes various components that facilitate production or processing of at least one product or other material. For instance, the system 100 can be used to facilitate control or monitoring of components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials or energy in different forms in some manner.

In the example shown in FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one input/output (I/O) module 104 is coupled to the sensors 102a and actuators 102b. The I/O modules 104 facilitate interaction with the sensors 102a, actuators 102b, or other field devices. For example, an I/O module 104 could be used to receive one or more analog inputs (AIs), digital inputs (DIs), digital input sequences of events (DISOEs), or pulse accumulator inputs (PIs) or to provide one or more analog outputs (AOs) or digital outputs (DOs). Each I/O module 104 includes any suitable structure(s) for receiving one or more input signals from or providing one or more output signals to one or more field devices.

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. These controllers 106 could interact with the sensors 102a, actuators 102b, and other field devices via the I/O module(s) 104. A second set of controllers 106 could be used to optimize the control logic or other operations performed by the first set of controllers. A third set of controllers 106 could be used to perform additional functions.

Controllers 106 are often arranged hierarchically in a system. For example, different controllers 106 could be used to control individual actuators, collections of actuators forming machines, collections of machines forming units, collections of units forming plants, and collections of plants forming an enterprise. A particular example of a hierarchical arrangement of controllers 106 is defined as the "Purdue" model of process control. The controllers 106 in different hierarchical levels can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control (MPC) or other advanced predictive control. As a particular example, each controller 106 could represent a computing device running a real-time operating system, a WINDOWS operating system, or other operating system.

Operator access to and interaction with the controllers 106 and other components of the system 100 can occur via various operator stations 110. Each operator station 110 could be used to provide information to an operator and receive information from an operator. For example, each operator station 110 could provide information identifying a current state of an industrial process to an operator, such as values of various process variables and warnings, alarms, or other states associated with the industrial process. Each operator station 110 could also receive information affecting how the industrial process is controlled, such as by receiving setpoints for process variables controlled by the controllers 106 or other information that alters or affects how the controllers 106 control the industrial process. Each operator station 110 includes any suitable structure for displaying information to and interacting with an operator. Multiple operations stations 110 are often collected into one or more control rooms.

This represents a brief description of one type of industrial process control and automation system that may be used to manufacture or process one or more materials. Additional details regarding industrial process control and automation systems are well-known in the art and are not needed for an understanding of this disclosure. Also, industrial process control and automation systems are highly configurable and can be configured in any suitable manner according to particular needs.

In particular embodiments, the various controllers and operator stations in FIG. 1 may represent computing devices. For example, each of the controllers and operator stations could include one or more processing devices and one or more memories for storing instructions and data used, generated, or collected by the processing device(s). Each of the controllers and operator stations could also include at least one network interface, such as one or more Ethernet interfaces or wireless transceivers.

In process control and automation systems such as the system 100, I/O modules use an internal clock or counter to maintain a read/reporting schedule. Thus, every I/O module can operate independently according to its own internal clock. If a new I/O module is added to the system when other I/O modules are already in service, the internal clock of the new I/O module may not be synchronized with internal clocks of other I/O modules. Data synchronicity issues at the central controller can result when different I/O modules report data to the controller in an unsynchronized manner.

Some existing systems attempt to solve data synchronicity issues by trying to synchronize the internal clocks of each I/O module or synchronize the communications between the components. However, synchronization with enough precision can be difficult to achieve for some systems. Because an I/O module may not precisely synchronize its clock with the central controller, this solution may be inadequate to maintain data synchronicity.

To address these and other issues, various components in the system 100 are designed or modified to support techniques for synchronizing messages using a least common multiple. For example, one or more of the I/O modules 104, controllers 106, or operator stations 110 could be configured to perform, or operate in conjunction with, one or more algorithms that synchronize messages using a least common multiple. Additional details regarding this functionality are provided below.

Although FIG. 1 illustrates one example of an industrial process control and automation system 100, various changes may be made to FIG. 1. For example, the system 100 could include any number of sensors, actuators, I/O modules, controllers, operator stations, networks, and other components. Also, the makeup and arrangement of the system 100 in FIG. 1 are for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment in which messages between components can be synchronized using a least common multiple. This functionality can be used in any other suitable system.

Figure 2:
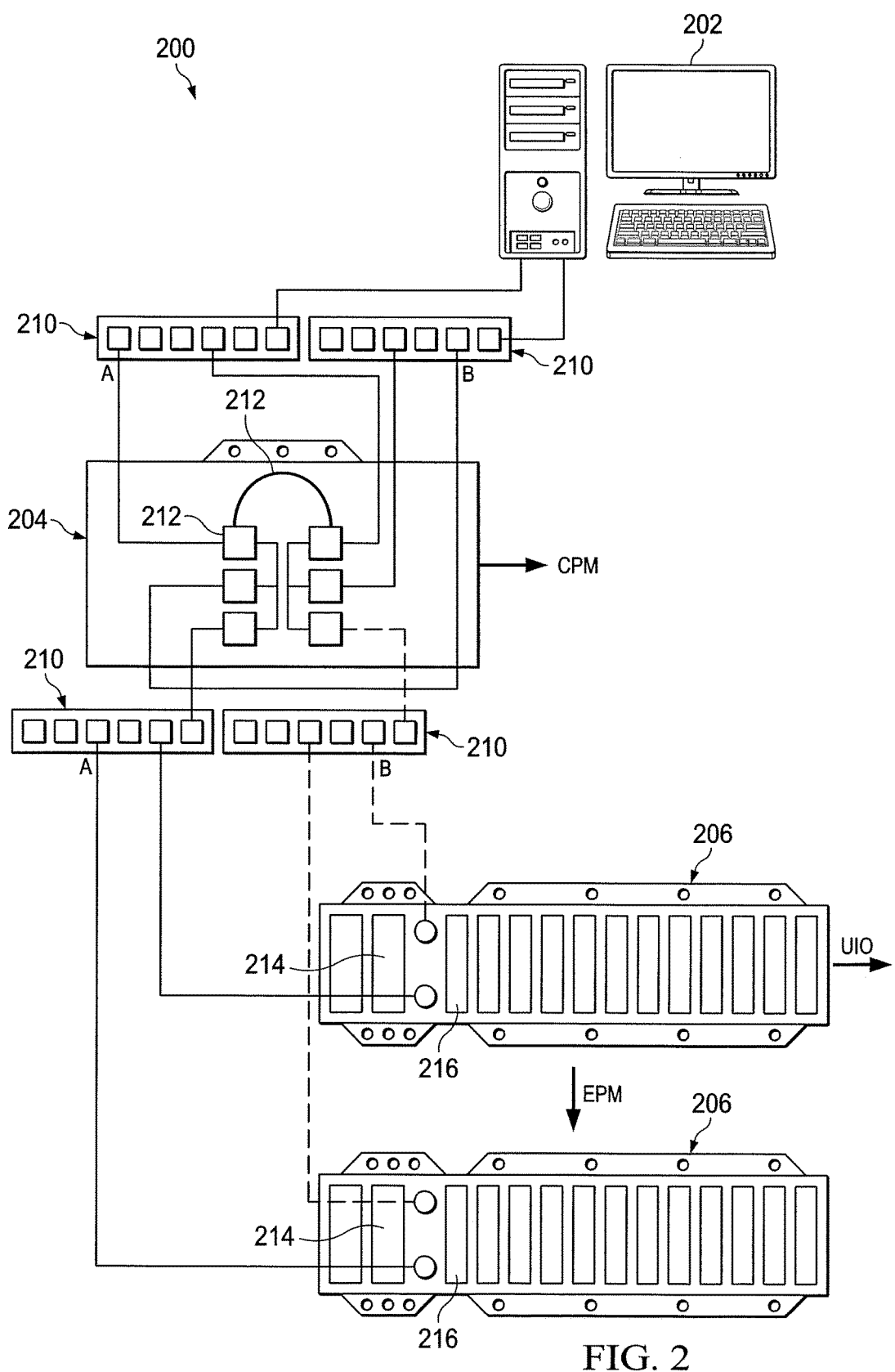
FIG. 2 illustrates additional details of a portion of an example industrial process and automation system according to this disclosure.

FIG. 2 illustrates additional details of a portion of an example industrial process and automation system 200 according to this disclosure. Many of the components shown in FIG. 2 may represent or be represented by corresponding components of the system 100 of FIG. 1. However, the system 200 could be used as part of any other suitable system.

As shown in FIG. 2, the system 200 includes various portions of a programmable logic controller (PLC) system. The components include one or more operator stations 202, a control processor module (CPM) rack 204, multiple expansion I/O racks 206, and multiple switches or routers 210. In some embodiments, the system 200 represents portions of a ControlEdge system by HONEYWELL INTERNATIONAL INC.

Each operator station 202 could be used to provide information to and receive information from an operator. For example, the operator station 202 could operate in a manner similar to one or more of the operator stations 110 of FIG. 1. As particular examples, each operator station 202 could provide information identifying a current state of an industrial process to an operator and receive information affecting how the industrial process is controlled. Each operator station 202 includes any suitable structure for displaying information to and interacting with an operator.

The racks 204-206 represent electronic component racks or cabinets having shelves and slots or other structures for installation of electronic components. In this example, the CPM rack 204 includes one or more CPMs 212. Each expansion I/O rack 206 includes an expansion processor module (EPM) 214. Depending on the configuration, each rack 204-206 includes zero, one, or multiple I/O modules 216. In this example, the CPM rack 204 does not include any I/O modules 216, and the expansion I/O racks 206 include multiple I/O modules 216. Common rack installations may include four, eight, or twelve I/O modules 216, although other numbers of I/O modules 216 are possible. Each rack 204-206 can also include one or more power supplies (not shown) for providing power to the rack 204-206 or to the components installed in the rack 204-206.

The CPMs 212 and EPMs 214 are PLC controllers and may represent or be represented by the controllers 106 of FIG. 1. The CPMs 212 and EPMs 214 perform various functions for control of one or more industrial processes. For example, the CPMs 212 or EPMs 214 may use measurements from one or more sensors (such as the sensors 102a) to control the operation of one or more actuators (such as the actuators 102b). These CPMs 212 and EPMs 214 could interact with the sensors, actuators, and other field devices via the I/O modules 216.

The CPMs 212 are considered "local" controllers and represent initial controllers installed for operation of a process control and automation system. In the "local" CPM rack 204, one of the CPMs 212 can be considered a primary controller, while the other CPM 212 can be considered a secondary controller, back-up controller, or redundancy controller. If a process control and automation system is large and requires expansion beyond the capacity of the local CPMs 212, one or more EPMs 214 can be installed and configured in the expansion I/O racks 206 to provide expanded capability in the process control and automation system, such as shown in the system 200. The CPMs 212 and EPMs 214 are configured to form a network, such as an Ethernet network. In such a network, at least one of the CPMs 212 acts as a "central" controller that provides instruction messages to the "expanded controllers" represented by the EPMs 214. Various EPMs 214 can be included in the system 200 or removed from the system 200 by plugging or unplugging cables at the EPMs 214. Traffic between the CPMs 212 and EPMs 214 can be controlled by the switches or routers 210.

Generally, ControlEdge systems, like the system 200, include one central controller (e.g., the primary CPM 212 or the secondary CPM 212), several expanded controllers (e.g., the EPMs 214), and many I/O modules (e.g., the I/O modules 216). Large-scale ControlEdge systems can include more expanded controllers and I/O modules than are shown in FIG. 2.

As discussed above, the CPM 212 communicates with the I/O modules 216 through the EPMs 214. Communication between the CPM 212 and each I/O module 216 is typically scheduled and repeats at a time interval according to a parameter TaskCycle. The TaskCycle parameter is a numeric value and is typically in units of seconds or milliseconds, although other units are possible. The CPM 212 can read data from or write data to each I/O module 216 every TaskCycle period. A user (e.g., a system administrator) can set the TaskCycle parameter for each task (e.g., set TaskCycle=10 ms). The TaskCycle parameter can be stored in a memory of the CPM 212, the EPM 214, the I/O module 216, the operator station 202, or any combination of these.

Each I/O module 216 also operates according to another parameter ScanTime. The ScanTime parameter determines how often an I/O module 216 replies to a read request from the CPM 212. That is, an I/O module 216 can reply to a read request every ScanTime period. The ScanTime parameter is a numeric value and is typically in units of seconds or milliseconds, although other units are possible. The ScanTime parameter is set by a user (e.g., a system administrator) and stored in a memory of the CPM 212, the EPM 214, the I/O module 216, the operator station 202, or any combination of these. Because each I/O module 216 is connected to a unique field device (e.g., a sensor 102a, actuator 102b, etc.) and each field device can be associated with a different preferred communication schedule, each I/O module 216 is therefore associated with its own ScanTime parameter and value. If an I/O module 216 is slow (e.g., older hardware with slower communication speed), the ScanTime parameter for that I/O module 216 can be set to a larger value according to the capabilities of the I/O module 216. Faster I/O modules 216 can have smaller ScanTime values.

In the system 200, an I/O module 216 (and its connected field device) may "join" (i.e., be added to) or "quit" (i.e., be removed from) the system 200 at any time. For example, an I/O module 216 may be added to the system 200 while the system 200 is in an active operational state. The newly added I/O module 216 needs to be configured to communicate with the CPM 212. For example, the new I/O module 216 needs to be configured to receive read request messages from the CPM 212 and, in reply to the read request messages, provide a sensor measurement message to the CPM 212.

Each I/O module 216 uses an internal clock or counter to maintain a read schedule in accordance with the ScanTime parameter. Thus, every I/O module 216 can operate independently according to its own internal clock. If a new I/O module 216 is added to the system 200 when other I/O modules 216 are already in service, the internal clock of the new I/O module 216 may not be synchronized with internal clocks of other I/O modules 216. Thus, even if the new I/O module 216 has the same ScanTime parameter as another I/O module 216, the I/O modules 216 may not perform synchronized reads and reports to the CPM 212 if their internal clocks are not synchronized. Data synchronicity issues at the CPM 212 can result when different I/O modules 216 report data to the CPM 212 in an unsynchronized manner.

In accordance with this disclosure, the system 200 is configured to support techniques for synchronizing messages using a least common multiple (LCM). Using the disclosed techniques, all I/O modules 216 having the same TaskCycle can maintain absolutely synchronous data reporting with the CPM 212. Similarly, I/O modules 216 with different TaskCycle values, but where one TaskCycle value is an integer multiple of another, can also maintain synchronous data reporting. This results in improved accuracy and sensitivity for the entire system 200.

The message synchronization technique uses a new field in the read request message. The CPM 212 transmits the read request message to the EPMs 214. In some embodiments, the CPM 212 transmits the read request message to all EPMs 214 in a broadcast manner. Each EPM 214 receives the read request message, checks the new field and the I/O modules 216 associated with the EPM 214, and replies with a measurement message (or another suitable message) to the CPM 212 if a condition is satisfied.

The format of the read request message sent from the CPM 212 to the EPMs 214 can be in the format shown in Table 1:

TABLE 1

| Read Request Message Format | | | | |
| --- | --- | --- | --- | --- |
| Read Sequence | Align Index | Reserve | Reserve | Pad |
| 2 bytes | 2 bytes | 8 bytes | 4 bytes | 28 bytes |

The 'Read Sequence' field, the 'Reserve' fields, and the 'Pad' field already exist in current implementations of the read request message. The 'Align Index' field is a new field of the read request message, and is used for synchronizing the messages between the CPM 212 and the EPMs 214. Each time the CPM 212 transmits the read request message, the CPM 212 increments the value of the 'Align Index' field. The 'Align Index' field loops from 1 to a LCM that is based on the TaskCycle and ScanTime parameters for all I/O modules 216. The EPMs 214 reply to the read request messages only when the value of the 'Align Index' field in the read request message is an even multiple of a scan rate associated with an I/O module 216.

In one aspect of operation, the CPM 212 determines the TaskCycle and ScanTime parameters for each I/O module 216 that is in communication with the CPM 212 and that provides read messages to the CPM 212. The CPM 212 then rounds the ScanTime parameter values to be a multiple of the TaskCycle value, if needed. For example, if the TaskCycle parameter is 10 ms, and the ScanTime parameter for a first I/O module 216 is 113 ms and the ScanTime parameter for a second I/O module 216 is 225 ms, the CPM 212 updates the values of the ScanTime parameters to 110 ms and 220 ms, respectively.

The CPM 212 then divides the value of the ScanTime parameters by the value of the TaskCycle parameter to determine a scan rate for each I/O module 216. Using the previous example, the CPM 212 divides the values of 110 ms and 220 ms by 10 ms to obtain scan rates of 11 and 22 for the first and second I/O modules 216 respectively. The CPM 212 then calculates the LCM of the scan rates of all I/O modules 216. In this example, the LCM of 11 and 22 is 22. The LCM is then used as an upper threshold for the 'Align Index' loop from 1 to the LCM in the read request messages.

Each read request message is transmitted from the CPM 212 to the EPMs 214 to request each EPM 214 to get values from the associated field devices (e.g., sensors 102a) through each I/O module 216. The read messages are broadcast according to a schedule determined by the Task-Cycle parameter.

When each EPM 214 receives the read request message, the EPM 214 check the scan rate of each I/O module 216 associated with the EPM 214. If the 'Align Index' value of the current read request message is a multiple of the scan rate of the I/O module 216, then the EPM 214 reads the value of the I/O module 216 and reports the value by sending a reply message to the CPM 212. Otherwise, the EPM 214 does not take any action with respect to that I/O module 216.

Figures 3, 4:
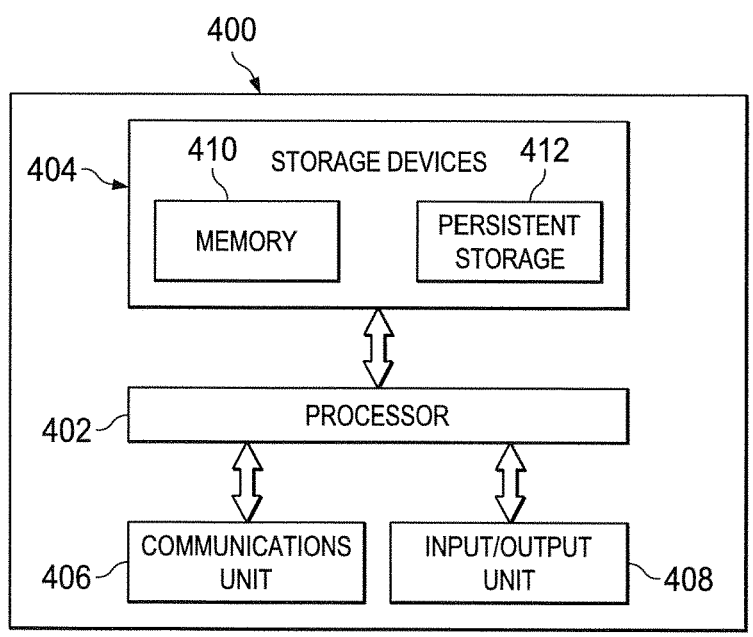
FIG. 3 illustrate an example of a technique for synchronizing messages using a least common multiple in a process control and automation system according to this disclosure.
FIG. 4 illustrates an example device for synchronizing messages using a least common multiple in a process control and automation system according to this disclosure.

FIG. 3 illustrates a particular example of the technique according to this disclosure. In FIG. 3, the TaskCycle parameter is set to 10 ms and the ScanTime parameter for two I/O modules 216 (identified here as I/O modules 216a-216b) are set at 20 ms and 30 ms respectively. The CPM 212 determines these values, such as by reading the values from one or more memories. The CPM 212 then determines a scan rate=2 for the I/O module 216a by dividing 20 ms by 10 ms, and determines a scan rate=3 for the I/O module 216b by dividing 30 ms by 10 ms. Then the CPM 212 determines the LCM of 2 and 3 to be 6. The CPM 212 then transmits read request messages with an 'Align Index' field. The value of the 'Align Index' field is incremented after each read request message is sent, up to the LCM. Once the value of the 'Align Index' field is greater than the LCM, the value is reset to 1, and the loop restarts. Thus the values of the 'Align Index' field in successive read request messages is 1, 2, 3, 4, 5, 6, 1, 2, . . . , as shown in FIG. 3.

When the EPM 214 receives a read request message with an 'Align Index'=1, the EPM 214 does not perform any I/O reads because 1 is not a multiple of the scan rate=2 (i.e., the scan rate of the I/O module 216a) or the scan rate=3 (i.e., the scan rate of the I/O module 216b).

When the EPM 214 receives a read request message with an 'Align Index'=2, the EPM 214 reads the value of the I/O module 216a with scan rate=2 because the align index=2 is a multiple of the scan rate=2. However, the EPM 214 does not read the value of the I/O module 216b because the align index=2 is not a multiple of the scan rate=3.

When the EPM 214 receives a read request message with an 'Align Index'=3, the EPM 214 reads the value of the I/O module 216b with scan rate=3 because the align index=3 is a multiple of the scan rate=3. However, the EPM 214 does not read the value of the I/O module 216a because the align index=3 is not a multiple of the scan rate=2.

When the EPM 214 receives a read request message with an 'Align Index'=4, the EPM 214 reads the value of the I/O module 216a because the align index=4 is a multiple of the scan rate=2. However, the EPM 214 does not read the value of the I/O module 216b because the align index=4 is not a multiple of the scan rate=3.

When the EPM 214 receives a read request message with an 'Align Index'=5, the EPM 214 does not perform any I/O reads because the align index=5 is not a multiple of either the scan rate=2 or the scan rate=3.

When the EPM 214 receives a read request message with an 'Align Index'=6, the EPM 214 reads the values of the I/O module 216a and the I/O module 216b because the align index=6 is a multiple of both the scan rate=2 and the scan rate=3.

When the 'Align Index' is incremented to be greater than the LCM of 6, the 'Align Index' is reset to 1 and the process repeats indefinitely. If the configuration of the system 200 changes (e.g., one or more I/O modules 216a-216b are added or removed from the system 200, or the ScanTime parameters for one or more I/O modules 216a-216b changes), the CPM 212 can calculate the LCM again.

Using this technique, multiple I/O modules 216 with different scan rates can align or synchronize their read reporting with the CPM 212. Also, it is not necessary to synchronize internal clocks among the CPM 212, the EPMs 214, and the I/O modules 216. Instead, synchronization is achieved based on review of the 'Align Index' field and taking action (or no action) depending on the value of the 'Align Index' field.

Although FIG. 3 illustrates one EPM 214 with two I/O modules 216a-216b, this is merely one example. The process could include read request messages sent to multiple EPMs 214, each EPM 214 could have any suitable number of I/O modules 216, and each I/O module 216 could have the same or different scan rates.

Although FIG. 2 illustrates one example of a system 200 in which synchronized communication can be used, various changes may be made to FIG. 2. For example, various components in FIG. 2 could be combined, further subdivided, or omitted and additional components could be added according to particular needs. Also, process control and automation systems can come in a wide variety of configurations, and FIG. 2 does not limit this disclosure to any particular configuration.

FIG. 4 illustrates an example device 400 for synchronizing messages using a least common multiple in a process control and automation system according to this disclosure. The device 400 could, for example, represent any of the controllers 106, the CPMs 212, the EPMs 214, or the operator station 202. However, the device 400 could represent any other suitable device or components for synchronizing messages using a least common multiple in a process control and automation system.

As shown in FIG. 4, the device 400 includes at least one processor 402, at least one storage device 404, at least one communications unit 406, and at least one input/output (I/O) unit 408. Each processor 402 can execute instructions, such as those that may be loaded into a memory 410. Each processor 402 denotes any suitable processing device, such as one or more microprocessors, microcontrollers, DSPs, FPGAs, ASICs, or discrete circuitry.

The memory 410 and a persistent storage 412 are examples of storage devices 404, which represent any structure(s) capable of storing and facilitating retrieval of information (such as data, program code, and/or other suitable information on a temporary or permanent basis). The memory 410 may represent a random access memory or any other suitable volatile or non-volatile storage device(s). The persistent storage 412 may contain one or more components or devices supporting longer-term storage of data, such as a read only memory, hard drive, Flash memory, or optical disc. In accordance with this disclosure, the memory 410 or the persistent storage 412 could be configured to store one or more algorithms that enable synchronizing messages using a least common multiple.

The communications unit 406 supports communications with other systems or devices. For example, the communications unit 406 could include at least one network interface card or wireless transceiver facilitating communications over at least one wired or wireless network. As a particular example, in accordance with this disclosure, the communications unit 406 could include any suitable structure and components to support communication of input or output messages with another component. The communications unit 406 may support communications through any suitable physical or wireless communication link(s).

The I/O unit 408 allows for input and output of data. For example, the I/O unit 408 may provide a connection for user input through a keyboard, mouse, keypad, touchscreen, or other suitable input device. The I/O unit 408 may also send output to a display, printer, or other suitable output device.

Although FIG. 4 illustrates one example of a device 400 for synchronizing messages using a least common multiple in a process control and automation system, various changes may be made to FIG. 4. For example, various components in FIG. 4 could be combined, further subdivided, or omitted and additional components could be added according to particular needs. Also, computing devices can come in a wide variety of configurations, and FIG. 4 does not limit this disclosure to any particular configuration.

Figure 5:
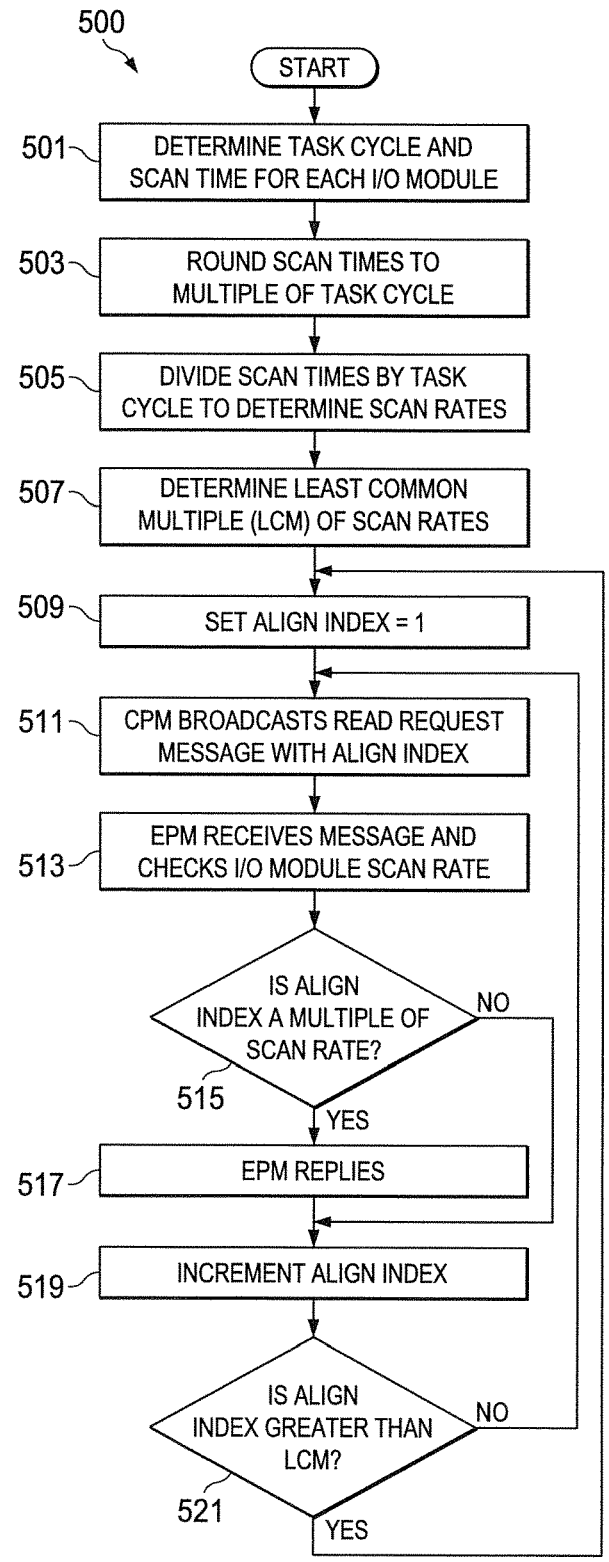
FIG. 5 illustrates an example method for synchronizing messages using a least common multiple in a process control and automation system according to this disclosure.

FIG. 5 illustrates an example method 500 for synchronizing messages using a least common multiple in a process control and automation system according to this disclosure. For ease of explanation, the method 500 is described as being performed using the system 100 of FIG. 1 or the system 200 of FIG. 2. However, the method 500 could be used with any suitable device or system.

A TaskCycle parameter and a ScanTime parameter for each of multiple I/O modules is determined at step 501. This could include, for example, the CPM 212 retrieving the TaskCycle parameter and the ScanTime parameters for each I/O module 216 from one or more memories.

If necessary, the determined ScanTime parameters are rounded to be a multiple of the TaskCycle parameter at step 503. This could include, for example, the CPM 212 rounding one or more of the ScanTime parameters to be a multiple of the TaskCycle parameter.

At step 505, scan rates for each I/O module are determined. This could include, for example, the CPM 212 dividing each ScanTime value by the TaskCycle value to determine the scan rate for each I/O module 216.

A least common multiple (LCM) of the scan rates is determined at step 507. This could include, for example, the CPM 212 determining the LCM of the scan rates of all I/O modules 216. The LCM is used as a threshold for the value of the 'Align Index' field.

At step 509, the value for the 'Align Index' field of the read request message is set to 1. This could include, for example, the CPM 212 setting the value for the 'Align Index' to 1.

A read request message is transmitted to EPMs at step 511. This could include, for example, the CPM 212 broadcasting a read request message to the EPMs 214. The read request message includes the 'Align Index' field.

At step 513, the read request message is received and a scan rate of each I/O module is compared with the value of the 'Align Index' field in the read request message. This could include, for example, each EPM 214 receiving the read request message and comparing the value of the 'Align Index' field to the scan rate of each I/O module 216 controlled by the EPM 214.

At step 515, it is determined if the value of the 'Align Index' field in the read request message is an integer multiple of the scan rate of each I/O module. This could include, for example, each EPM 214 that receives the read request message determining if the value of the 'Align Index' field in the read request message is an integer multiple of the scan rate of each I/O module 216. If the value of the 'Align Index' field is an integer multiple of the scan rate of an I/O module 216, then the method 500 moves to step 517. Otherwise, the method 500 moves to step 519.

At step 517, a reply message is generated and sent to the CPM. This could include, for example, the EPM 214 obtaining a measurement value from a field device through the I/O module 216, generating a reply message that includes the measurement value, and sending the reply message to the CPM 212.

At step 519, the value for the 'Align Index' field of the read request message is incremented by 1. This could include, for example, the CPM 212 increasing the value for the 'Align Index' by 1.

At step 521, it is determined if the value for the 'Align Index' field is greater than the LCM determined in step 507. This could include, for example, the CPM 212 determining if the value of the 'Align Index' field is greater than the LCM. If the value of the 'Align Index' field is greater than the LCM, then the method 500 returns to step 509 to reinitialize the value of the 'Align Index' field. Otherwise, the method 500 returns to step 511 to transmit another read request message.

Although FIG. 5 illustrates one example of a method 500 for synchronizing messages using a least common multiple in a process control and automation system, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs. In addition, while the method 500 is described with respect to the systems 100, 200 (which were described with respect to an industrial process control and automation system), the method 500 may be used in conjunction with other types of devices and systems.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    determining a scan rate associated with each of a plurality of input/output (I/O) modules;
    transmitting a read request message to at least one expansion controller that controls the plurality of I/O modules, the read request message having an align index field;
    receiving a reply message from the at least one expansion controller for each of the I/O modules for which a value of the align index field of the read request message is an even multiple of the associated scan rate;
    incrementing the value of the align index field; and
    repeating the transmitting, receiving, and incrementing until the value of the align index field is greater than a threshold, wherein the threshold is a least common multiple of the scan rates of the plurality of I/O modules.

2. The method of claim 1, wherein determining the scan rate associated with each I/O module comprises:
determining a task cycle associated with transmission of the read request messages;
determining a scan time of each I/O module; and
dividing the scan time of each I/O module by the task cycle to determine the scan rate of each I/O module.

3. The method of claim 2, wherein determining the scan rate associated with each I/O module further comprises:
rounding one or more of the scan times to a multiple of the task cycle.

4. The method of claim 1, further comprising:
when the value of the align index field is greater than the threshold, setting the value of the align index field to one and repeating the transmitting, receiving, and incrementing.

5. The method of claim 1, further comprising:
determining the least common multiple of the scan rates of the plurality of I/O modules.

6. The method of claim 1, wherein:
each I/O module is coupled to a field device, and
the reply message comprises a measurement value from the field device coupled to the I/O module associated with the reply message.

7. The method of claim 6, wherein the at least one expansion controller, the plurality of I/O modules, and the field devices form part of an industrial process control and automation system.

8. An apparatus comprising:
at least one network interface configured to communicatively connect to at least one expansion controller that controls a plurality of input/output (I/O) modules; and
at least one processing device configured to:
determine a scan rate associated with each of the I/O modules;
transmit a read request message to the at least one expansion controller, the read request message having an align index field;
receive a reply message from the at least one expansion controller for each of the I/O modules for which a value of the align index field of the read request message is an even multiple of the associated scan rate;
increment the value of the align index field; and
repeat the transmitting, receiving, and incrementing until the value of the align index field is greater than a threshold, wherein the threshold is a least common multiple of the scan rates of the plurality of I/O modules.

9. The apparatus of claim 8, wherein to determine the scan rate associated with each I/O module, the at least one processing device is configured to:
determine a task cycle associated with transmission of the read request messages;
determine a scan time of each I/O module; and
divide the scan time of each I/O module by the task cycle to determine the scan rate of each I/O module.

10. The apparatus of claim 9, wherein to determine the scan rate associated with each I/O module, the at least one processing device is further configured to:
round one or more of the scan times to a multiple of the task cycle.

11. The apparatus of claim 8, wherein the at least one processing device is further configured to:
when the value of the align index field is greater than the threshold, set the value of the align index field to one and repeat the transmitting, receiving, and incrementing.

12. The apparatus of claim 8, wherein the at least one processing device is further configured to:
determine the least common multiple of the scan rates of the plurality of I/O modules.

13. The apparatus of claim 8, wherein:
each I/O module is coupled to a field device, and
the reply message comprises a measurement value from the field device coupled to the I/O module associated with the reply message.

14. The apparatus of claim 13, wherein the apparatus comprises a controller configured for use in an industrial process control and automation system that includes the at least one expansion controller, the plurality of I/O modules, and the field devices.

15. A non-transitory computer readable medium containing instructions that, when executed by at least one processing device, cause the at least one processing device to:
determine a scan rate associated with each of a plurality of input/output (I/O) modules;
transmit a read request message to at least one expansion controller that controls the plurality of I/O modules, the read request message having an align index field;
receive a reply message from the at least one expansion controller for each of the I/O modules for which a value of the align index field of the read request message is an even multiple of the associated scan rate;
increment the value of the align index field; and
repeat the transmitting, receiving, and incrementing until the value of the align index field is greater than a threshold, wherein the threshold is a least common multiple of the scan rates of the plurality of I/O modules.

16. The non-transitory computer readable medium of claim 15, wherein the instructions to determine the scan rate associated with each I/O module comprise instructions to:
determine a task cycle associated with transmission of the read request messages;
determine a scan time of each I/O module; and
divide the scan time of each I/O module by the task cycle to determine the scan rate of each I/O module.

17. The non-transitory computer readable medium of claim 16, wherein the instructions to determine the scan rate associated with each I/O module further comprise instructions to:
round one or more of the scan times to a multiple of the task cycle.

18. The non-transitory computer readable medium of claim 15, further containing instructions that, when executed by the at least one processing device, cause the at least one processing device to:
when the value of the align index field is greater than the threshold, set the value of the align index field to one and repeat the transmitting, receiving, and incrementing.

19. The non-transitory computer readable medium of claim 15, further containing instructions that, when executed by the at least one processing device, cause the at least one processing device to:
determine the least common multiple of the scan rates of the plurality of I/O modules.

20. The non-transitory computer readable medium of claim 15, wherein:
each I/O module is coupled to a field device, and the reply message comprises a measurement value from the field device coupled to the I/O module associated with the reply message.

\* \* \* \* \*